United States Patent [19]

Fürstenau

[11] Patent Number: 5,117,471
[45] Date of Patent: May 26, 1992

[54] BISTABLE OPTICAL SWITCHING ARRANGEMENT

[75] Inventor: Norbert Fürstenau, Braunschweig, Fed. Rep. of Germany

[73] Assignee: Deutsche Forschungsanstalt fur Luft- und Raumfahrt e. V., Köln, Fed. Rep. of Germany

[21] Appl. No.: 725,623

[22] Filed: Jul. 8, 1991

[30] Foreign Application Priority Data

Jul. 4, 1990 [DE] Fed. Rep. of Germany ....... 4021293

[51] Int. Cl.$^5$ .......................... G02B 6/10; G01B 9/02; H01J 5/16; H01S 3/00
[52] U.S. Cl. .......................... 385/16; 385/27; 385/40; 356/345; 356/351; 250/227.19; 372/25; 372/29; 372/38
[58] Field of Search ............. 385/12, 11, 14, 16, 385/27, 39, 38, 40; 356/345, 351; 250/227.11, 227.19; 372/25, 29, 33, 38

[56] References Cited

U.S. PATENT DOCUMENTS

| | | | |
|---|---|---|---|
| 4,752,132 | 6/1988 | Pavlath | 356/345 |
| 4,759,627 | 7/1988 | Thylén et al. | 356/345 |
| 4,799,797 | 1/1989 | Huggins | 356/344 |
| 4,884,280 | 11/1989 | Kinoshita | 372/38 |
| 4,897,543 | 1/1990 | Kersey | 356/345 |
| 4,912,716 | 3/1990 | Mead | 372/38 |
| 4,928,007 | 5/1990 | Furstenau et al. | 356/345 |
| 4,980,891 | 12/1990 | Izadpanah | 372/25 |
| 4,989,979 | 2/1991 | Buckman | 356/345 |
| 5,034,603 | 7/1991 | Wilson | 356/345 |

FOREIGN PATENT DOCUMENTS

| | | | |
|---|---|---|---|
| 3818865 | 7/1989 | Fed. Rep. of Germany | 356/345 X |
| 60-263126 | 12/1985 | Japan | 385/16 X |
| 2127623 | 5/1990 | Japan | 356/345 X |
| 2174505 | 11/1986 | United Kingdom | 356/345 X |
| 2181857 | 4/1987 | United Kingdom | 356/345 X |

OTHER PUBLICATIONS

Cross et al., "Optically Controlled Two Channel Integrated-Optical Switch" IEEE Journal of Quantum Electronics, vol. QE-14, No. 8, Aug. 1978.

*Primary Examiner*—Brian Healy
*Attorney, Agent, or Firm*—Salter, Michaelson & Benson

[57] ABSTRACT

In an optical switching arrangement comprising a laser, an electrooptical phase modulator formed as a two-arm interferometer, and a second two-arm interferometer as a multistable element, the second interferometer is formed with interferometer arms having optical pathlength differences of the order of magnitude of $10^4$ times the wavelength of the light from the laser and has at least one signal output arranged parallel to a further output; the further output is connected to a photodiode the output voltage of which is amplified and then used to control the current supply of the laser. The wavelength of the light emitted by the laser is variable by changing the control voltage of the modulator or the bias voltage of the current supply of the laser so that the output signal alternates between two stable interference signals.

8 Claims, 4 Drawing Sheets

BISTABLE OPTICAL SWITCHING ARRANGEMENT

BACKGROUND OF THE INVENTION

The invention relates to an optical switching arrangement and more particularly to a bistable switch with a laser as the light source, an electrooptical modulator formed as a first two-arm interferometer with control electrodes, and connected after the modulator, a second two-arm interferometer as a bistable element, the second interferometer having an output for a part of the light to which a photodiode is connected, the output voltage of which is used as a feedback magnitude for controlling the laser current.

In an optical switch of the type mentioned (DE-OS 38 18 865) it is possible to transform a continuously changing input signal into discrete output conditions in the form of light intensities or electrical voltages. The basis for this is a hysteresis curve which arises from the (G-u*) input/output characteristic, on which stationary values of the output intensities are achieved as a function of the proportionality factor, these values being used for the digitalisation. In the practical embodiment the output voltage is connected up to the electrodes of the two-arm interferometer used as a multi-stable element, so that the electrodes are then controlled up to the stationary value on the hysteresis curve, which corresponds to the light intensity fed in. The amplified voltage connected up to the electrodes of the multi-stable element as a control magnitude is then proportional to the light intensity and represents the measured value to be indicated for the intensity of the light fed to the multi-stable element.

In a further known arrangement (IEEE Journal of Quantum Electronics, Vol. QE-14, No. 8, August 1978, pages 577 to 580), which has an integrated optical $2 \times 2$ coupler, the light emanating from one of the two output arms is passed to a photo diode, the output voltage of which is passed back after amplification to the electrodes of the electrooptical modulator, which affects the phase mismatching of the two emanating light waves in the coupling area of the light coupler.

The advantage of these known arrangements lies in that the non-linearity required for the bistable mode is implemented by the transmission characteristics of the bistable element, and non-linear optical material, which requires relatively high optical input power, is not required.

The disadvantage of these known arrangements lies in that optoelectrical switches are required, i.e. switches in which an electrical feedback to the switch itself is necessary. The achievable switching speeds are therefore limited. More complex structures with a number of connected bistable electrooptical switches require optical as well as electrical connections through which the possibilities for implementation are drastically curtailed.

SUMMARY OF THE INVENTION

The present invention seeks to provide a bistable optical switch in which, in the switch itself, no electrical components are required and which nevertheless manages without non-linear optical materials, for example a switch with a yes/no output or an either/or output.

According to the present invention there is provided an optical switching arrangement comprising as a light source a laser with current supply means, an electrooptical modulator formed as a first two-arm interferometer with control electrodes, and connected after the modulator a second two-arm interferometer as a multi-stable element, said modulator passing light to said second two arm interferometer, and said second interferometer having a first output for a part of the light, a photodiode being connected to said first output, the output voltage of said photodiode being used as a control magnitude, wherein said second two-arm interferometer is formed with interferometer arms having optical pathlength differences between the two interferometer arms of the order of magnitude of $10^4$ of the wavelength of the light from said laser, wherein said second two-arm interferometer has at least one second output forming a respective at least one signal output, said signal output being arranged parallel to said first output; wherein the output voltage of said photodiode is used to control said current supply means of said laser; and wherein the wavelength of the light passed to said second two-arm interferometer is variable so that an output appears in bistable manner at one or other of said two output arms of said second interferometer according to said wavelength.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the present invention provides an optical switching arrangement with a laser as the light source, an electrooptical modulator formed as a first two-arm interferometer with control electrodes, and connected after the modulator, a second two-arm interferometer as a multi-stable element, the second interferometer having an output for a part of the light to which a photodiode is connected, the output voltage of which is used as a control magnitude, wherein the second two-arm interferometer is formed with interferometer arms having optical pathlength differences between the two interferometer arms of the order of magnitude of $10^4$ of the wavelength of the light from the laser, and has at least one second output forming a signal output, which is arranged parallel to the output which is connected to the photodiode; the output voltage of the photodiode is used to control the current supply of the laser; and the wavelength of the light passed to the second two-arm interferometer is variable so that an output appears in bistable manner at one or the other of the two output arms of the interferometer according to the wavelength.

With the switch in accordance with the invention the arrangement corresponds to the electrooptical type inasmuch as no non-linear optical material is required. Control takes place here however via the light source and not via an electrooptical modulator, so that purely optical connection of several bistable switches is possible and also purely optical logic circuits with the very high switching speeds associated therewith.

Figure 1:
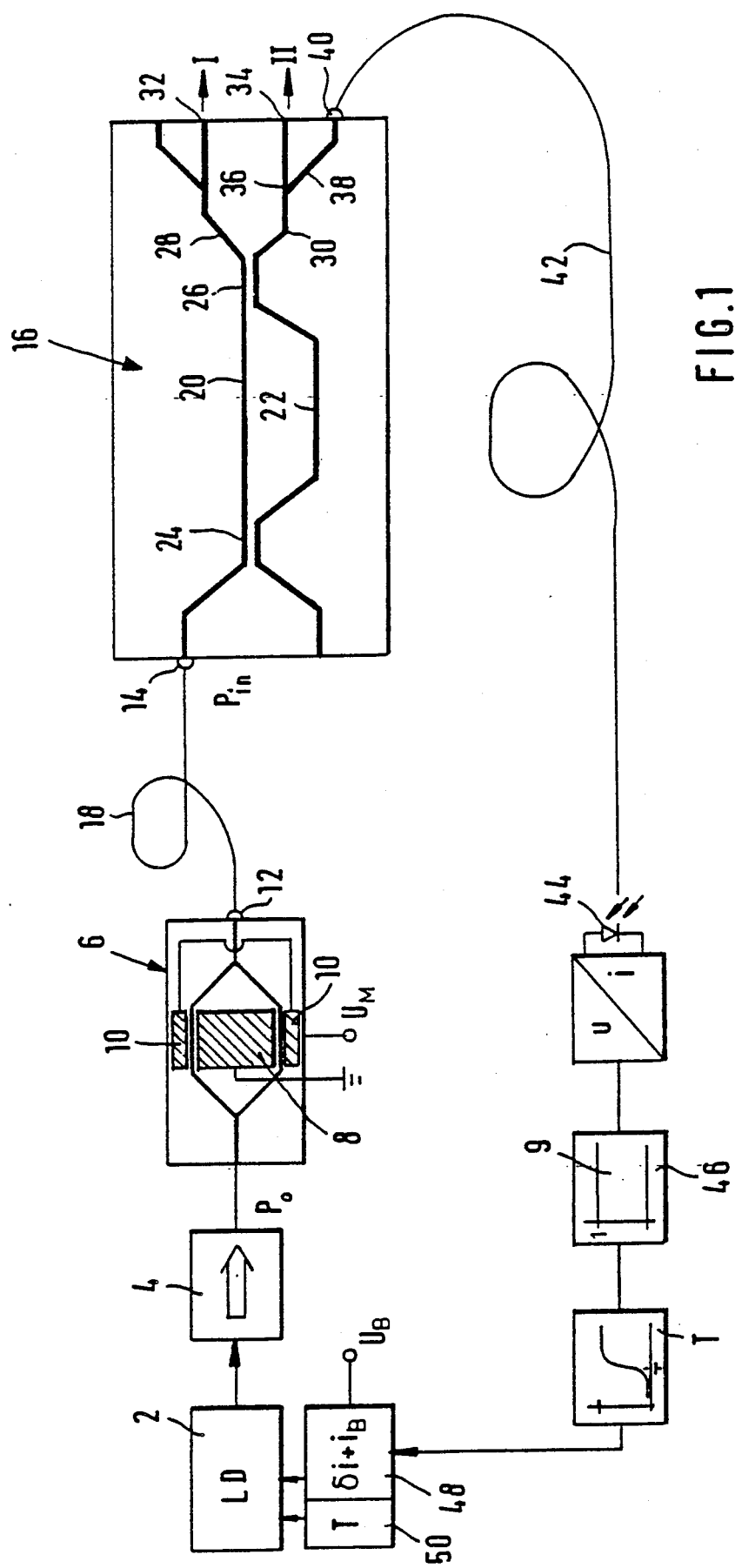
FIG. 1 shows the electrical and optical circuit of a bistable optical switch in accordance with a first embodiment with a two-arm interferometer of the Mach-/Zehnder type as the bistable element.

Referring to the drawings, in the circuit shown in FIG. 1, a light source formed as a laser diode 2 is provided, after which is connected an optical insulator 4, from which the light power $P_o$ is fed to an electrooptical modulator 6 which is formed here as a two-arm interferometer of the Mach/Zehnder type. This modulator is of known construction type and has a base electrode 8 lying at earth potential and two control electrodes 10, to which a modulation voltage $u_M$ is applied, by means of which the light intensity $P_{in}$ is variable at the input of the bistable element. The output 12 of the modulator 6 is connected to an input 14 of a bistable element 16 which is formed as a two-arm interferometer of the Mach/Zehnder type. The connection between the modulator 6 and the bistable element 16 is produced via a polarisation-maintaining single mode fibre 18, so that the actual optical switch 16 may be located as far as desired away from the light source 2 and modulator 6.

The bistable element 16 has two interferometer arms 20, 22 which are of different length and in fact with a pathlength difference of the order of magnitude of $10^4$ time the wavelength of the light of the laser diode 2, in which the interferometer arm 22 is the longer arm. The light wave is subdivided at the input 14 via a directional coupler 24 into 50% into each of the two arms 20, 22 of the Mach/Zehnder interferometer having different path lengths. After passing through the interferometer arms, an interference signal is produced in a 2×2 coupler 26 by superimposition of the two light waves. From the theory of the two-beam interferometer it is known that in the two output arms 28, 30 of the coupler 26 in each case an interference signal may be seen, phase-shifted by $\pi$rad ($= 180°$) This signal is applied to the two outputs 32, 34 as signals I and II, i.e. the signal I at the output 32 shows maximum intensity (constructive interference), if the signal II is applied to the output 34 with minimum intensity (destructive interference).

From at least one of the output arms 28, 30 (here 30) a small fraction of the output intensity is coupled into a further output arm 38 via a junction device 36, a glass fibre 42 being connected to its output 40, via which the light which is coupled out via the junction device 36 is passed to a photodiode 44. The output voltage u of the photodiode is connected up to an amplifier 46 with the gain factor g, in which the amplified output voltage from the photodiode 44, with the feedback delay time T, is connected up to the current supply 48 of the laser diode 2. This current supply with the constant offset current $i_B$ corresponding to the constant bias voltage $u_B$ determines the fundamental wavelength of the laser diode. Via the feedback of the intensity coupled out at the output 40 from the element 16 the laser diode current $\delta i + i_B$ and thus the wavelength of the light emitted by the laser diode 2 is modulated. The dependence of the wavelength of the light emitted by the laser diode on the current feeding the laser diode will be dealt with in detail later.

In order to achieve constant working conditions the current supply of the laser diode is also provided with a temperature stabilising unit 50, with which the temperature fluctuations of the laser diode mounted on a Peltier cooler is stabilised to better than $10^{-2}$ K. Moreover the fundamental wavelength can be shifted over a certain range via the temperature.

Figure 2:
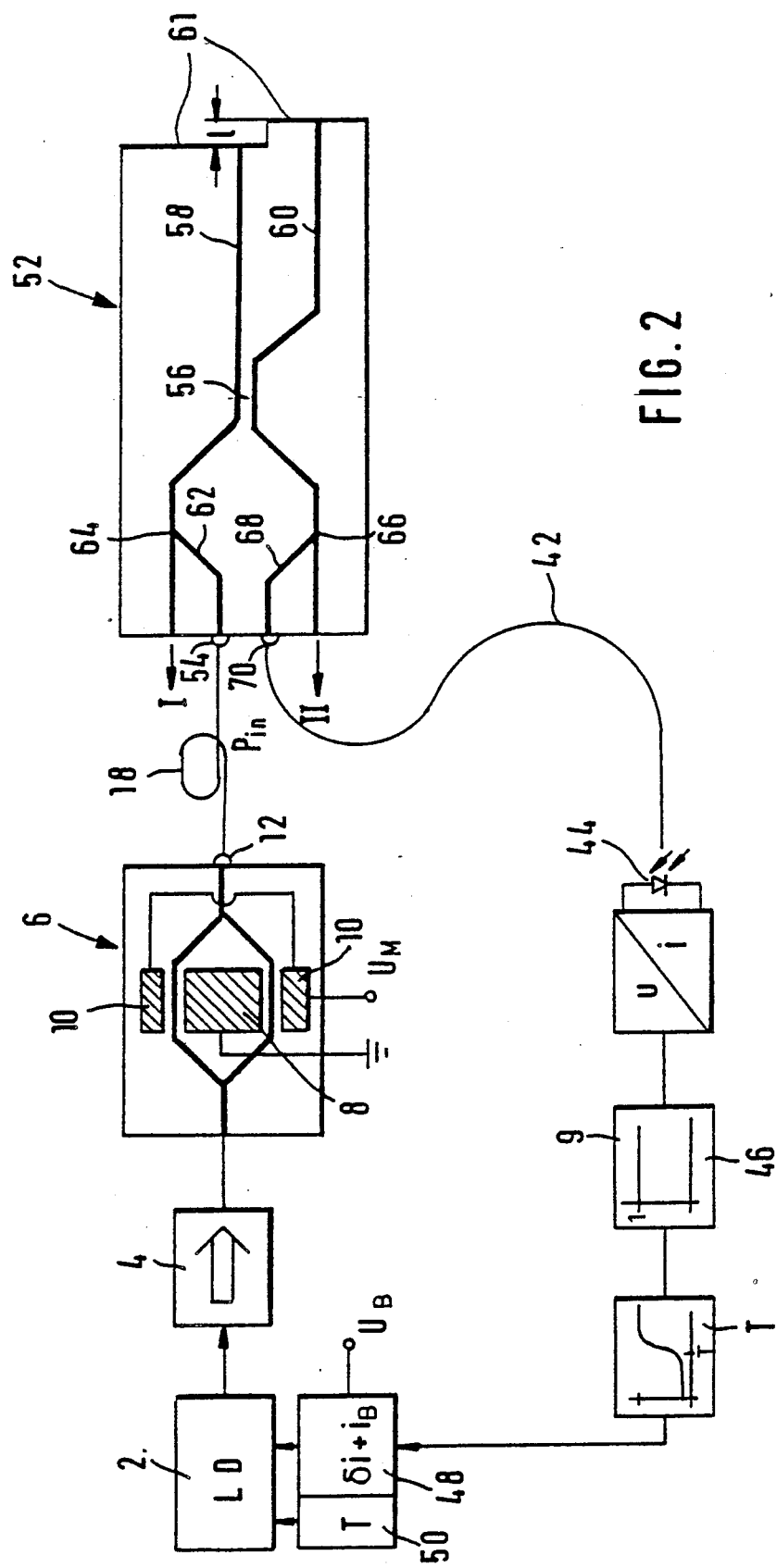
FIG. 2 shows a similar circuit with a Michelson two-arm interferometer as the bistable element.

In the embodiment according to FIG. 2 a Michelson interferometer 52 is provided instead of a Mach/Zehnder interferometer. The remaining components correspond to those according to FIG. 1. Accordingly reference is made to the description of FIG. 1.

The light applied to the input 54 is subdivided via a 2×2 coupler 56 into the two arms 58, 60 of the interferometer having different path lengths. The end surfaces of these two arms are mirrored in the usual way. With an integrated optical construction the end face 61 of the substrate, in which the mirrors are arranged, may be formed with a shoulder having a length 1, through which the larger length of the interferometer arm 60 is achieved An interference signal is produced as in the embodiment according to FIG. 1 from the light waves reflected by means of the end mirroring in the 2×2 coupler 56 by superimposing the two light waves Said interference signal emerges from the inputs I or II depending on the phase relationship, the inputs being connected in each case via junction devices 64 and/or 66 to the input optical conductor 62 and/or output optical conductor 68. The light coming out of the output waveguide 68 at the output 70 of the interferometer 52 is passed via the glass fibre 42 to the photodiode 44. With this arrangement too when using one of the outputs I, II a yes/no signal may be tapped and when using both outputs an either/or signal may be tapped.

With the above described embodiments a wavelength modulation with the input light power $P_{in}$ is present as the switching parameter.

For this the following is true:

The arrangements described above with reference to FIGS. 1 and 2 are non-linear, fed back systems with the time constant $\tau$ and the feedback delay time T. In order to determine the stationary conditions they are described by the recursive equation:

$$P_{n+1} = \frac{\sigma \, T \, K_1}{l + \mu} \, (i_B + g \, \eta \, P_n)[1 + \mu \cos(-K_2 \, P_n + \phi_B)]. \qquad 1)$$

$P_n$ is the output power at the photodiode at the time $t_n$; $\mu$ is the interference contrast (modulation index) of the interferometer; T is the interferometer transmission; $\alpha$ is the attenuating factor of the intensity modulator 6; $\alpha P_o = P_{in}$; $i_B$ is the constant offset current through the laser diode; g is a gain factor, $\kappa$ is the conversion factor of the interferometer output power in photodiode current, $K_1$ is the conversion factor of the laser diode current in laser output power $P_{LD} = K_1(i_B + g\kappa P_n) = P_o + g\, P_n$; $K_2$ describes, as a proportionality factor between the light output and phase, the relationship between the light wavelength, which is dependent on the diode current and the diode temperature, and the phase difference of the light waves in the two interferometer arms, which is dependent thereon due to the optical length difference $\Delta L$ of the light waves.

The phase difference based on the path length difference amounts to:

$$\Delta \phi = \frac{2\pi}{\lambda} \, n \, \Delta L. \qquad 2)$$

The variation of this phase difference due to wavelength modulation is given by (ignoring the dispersion n(λ)):

$$\delta\phi = \frac{\partial \Delta\phi}{\partial \lambda} \delta\lambda \qquad 3)$$
$$= -\frac{2\pi}{\lambda^2} n \Delta L \delta\lambda$$

Since λ is approximately proportional to the diode current and diode temperature in the region between the mode jumps of the laser diode and since these parameters in turn vary proportionally to the output power from the interferometer, the whole phase difference at the time $t_n$ may be written as:

$$\phi\text{total} \mid_n = \Delta\phi + \delta\phi_\eta \qquad 4)$$
$$= \phi_B - K_2 + P_n$$
$$= \phi_B + \mu\delta T - b\, i_\eta)$$

The constant phase component $\Delta\Phi = \Phi_B = -b\, i_B$ is given by the optical pathlength difference of the interferometer arms and the wavelength (and/or the LD current) in the modulation-free case ($i = i_B$).

Rapid wavelength modulation of the laser diode is only possible by means of the current, so that the following is true for the case of constant temperature:

$$\phi\text{total} \mid_n = \phi_B + \delta\phi_\eta \qquad 5)$$
$$= \phi_B\left(1 - \frac{\delta\lambda}{\lambda}\mid_\eta\right)$$
$$= -b(i_B + i_n)$$
$$= \frac{-b}{K_q}(P_o + K_1 g \eta P_n)$$

Thus the proportionality factor $K_2$ from (1) is defined by $K_2 = b\, g\, \kappa$. The change in the wavelength with the current for a fixed laser mode of the order m is of the order of magnitude:

$$\left.\frac{\partial \lambda_m}{\partial i}\right|_{TWS} = 0.01 \text{ nm/mA} \qquad 6)$$

in the case of a temperature-stabilised laser diode.

$T_{WS}$ is the temperature of the heat sink. A change in phase of $\pi$ is then achieved by:

$$\delta\phi = \pi = -\Delta\phi \frac{\delta\lambda}{\lambda} \qquad 7)$$

Thus with (2) there results for example for a maximum wavelength change of $\delta\lambda = 0.2$ nm in the case of a Mach/Zehnder interferometer a necessary pathlength difference in the interferometer arms of (wavelength $\lambda = 830$ nm, refractive index $n = 1.46$)

$$\Delta L = 2.4 \text{ mm} \qquad 8)$$

i.e. that with this difference in the pathlengths of the interferometer arms the light intensity may be switched over by a wavelength rise of 0.2 nm from one output arm of the interferometer to the other. Based on the known hysteresis characteristic of bistable arrangements, which is shown in the diagram in FIG. 3, small changes in wavelength do not cause any noticeable changes in output intensity (apart from the critical value at the discontinuity). For switching over to the original output arm the wavelength has to be taken back below the value at the last switchover point. The light intensity $P_{in} = \sigma P_o$ is used as the control parameter for switching over the bistable element and may be varied by the electrooptical intensity modulator 6 by changing the modulation voltage $u_M$ which is applied to the electrodes 10.

The mode of operation of the bistable interferometer 16 and/or 52 may be explained with the aid of the equations (1) and (4). For stationary conditions of the system both equations have to be fulfilled at the same time, so that the permitted solutions are given by the points of intersection of the two corresponding graphs. In normalised notation from (1) and (4) there result the two equations for the stationary normalised output voltage $u^*$ $$\frac{u^*}{G} = \frac{\eta P^*}{GU_\pi} = \frac{-1}{\pi(1+\mu)}(\phi_B + \delta\phi)[1 + \mu \cos(\delta\phi + \phi_B)] \qquad 9)$$

as the interferometer characteristic (with $G = \sigma T K_i g \kappa$ and $U_\pi = \pi 2/K_2$ and $$\frac{u^*}{G} = \frac{-\delta\phi}{G} \qquad 10)$$

for the dependence of the phase on the output power, this dependence being determined by the feedback in conjunction with the interferometer asymmetry. Both equations must be satisfied simultaneously for possible states of the system.

Points of intersection (stationary fixed points) between the periodic interferometer characteristic (9) and the straight line (10) only exist for $$G < \frac{1+\mu}{1-\mu} \qquad 11)$$

as a condition for the dimensionless input parameter G. Under these conditions by changing $P_{in}$ it is possible to switch back and forth between different stationary states.

As an equation for the stationary fixed points from (1) the following is obtained in normalised notation:

$$u^* = \frac{G}{1+\mu}(u^* + u_B)[1 + \mu \cos(-\pi(u^* + U_B))] \qquad 12)$$

Figure 3:
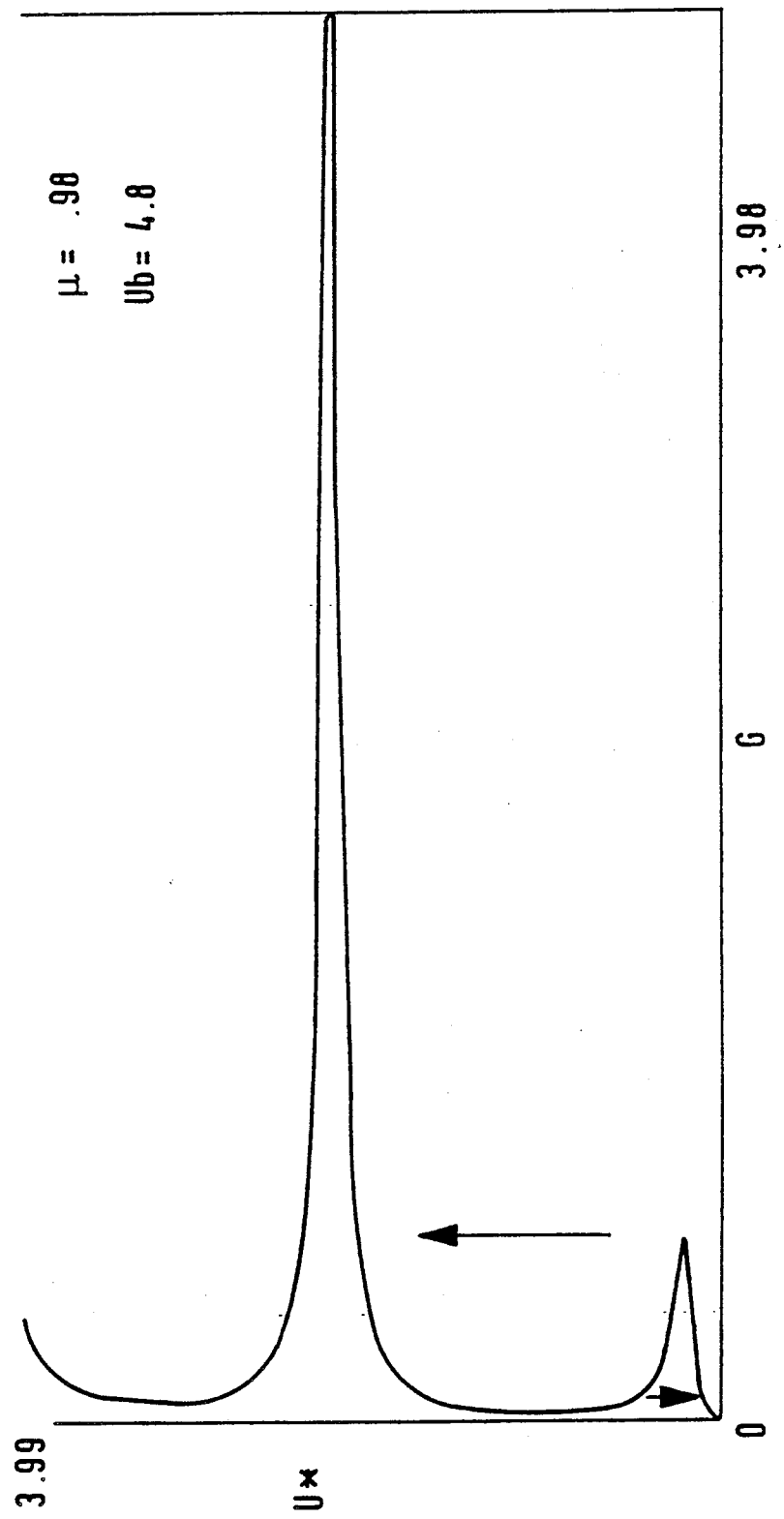
FIG. 3 shows a diagram of a typical hysteresis curve with the stationary values of the output intensities as a function of the proportionality factor.

Equation (12) describes the typical hysteresis shaped dependence of the stationary fixed points $u^*$ on the control parameter G and/or the input power, as shown in FIG. 3 using an example. Switching over between stationary conditions by changing $P_{in}$ is indicated by the arrows.

The above example of a wavelength change of 0.2 nm requires a change in the laser diode current of $\delta = 20$ mA. Here the optical output power of the diode may change by more than the factor 2. This is taken into account in equation (1).

Figure 4:
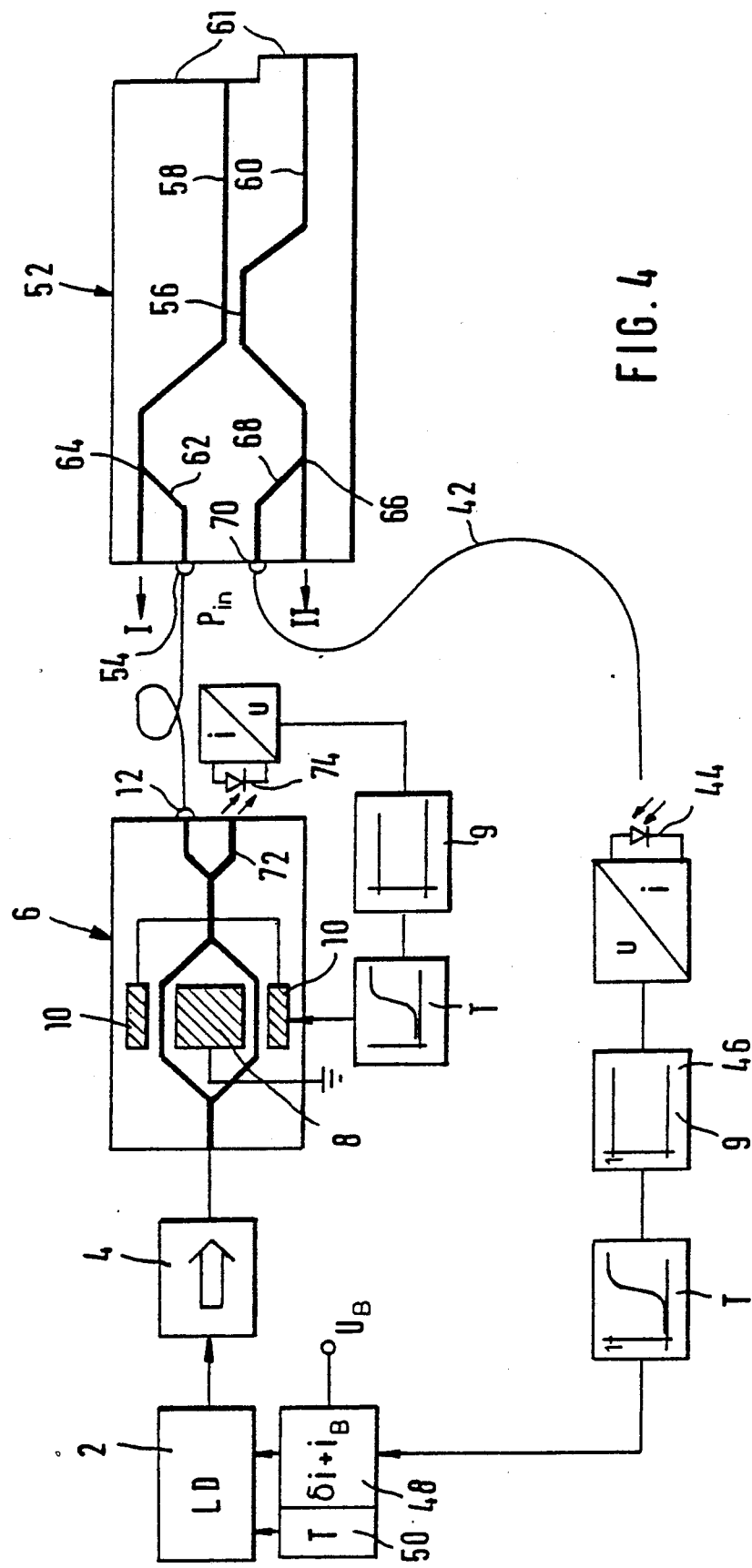
FIG. 4 shows a further embodiment of a circuit with a two-arm interferometer of the Michelson type as the bistable element.

In the embodiment according to FIG. 4 the whole arrangement is similar to that according to FIG. 2. While with the above discussed embodiments for switching over the bistable element 52 with the aid of wavelength change via the modulator 6, the light intensity $P_{in}$ is changed, the embodiment according to FIG. 4 operates with a constant light input power $P_{in}$ and the offset current $i_B$ as the control parameter. The light wavelength is changed via the offset voltage $u_B$, which is applied to the current supply 48 of the laser diode 2. In order to achieve a constant light output $\sigma P_{LD}$ an additional bistable arrangement is used in which while using the non-linear (cosine-shaped) input/output characteristic of the electrooptically fed back Mach-/Zehnder interferometer—which is used as a modulator—stabilisation is again effected by hysterisis, here produced electrooptically. For this a part of the light is coupled out of the modulator 6 via a parallel-connected output line 72 and is directed at a photodiode 74. The output voltage of the photodiode is amplified by the factor g and is connected to the electrodes 10 of the modulator 6 with the feedback delay time T. Instead of a bistable circuit for stabilising $P_{LD}$ a conventional control circuit may be used. The electrooptical intensity modulator 6 is thus incorporated into a control loop for controlling $\sigma$, which for example through desired/actual value comparison (comparison of a predetermined laser diode offset current $e_{PS}$ with the input power $\sigma P_{LD}$) and through corresponding variation of the modulator voltage $\sigma P_{LD}$ keeps it constant.

It will be understood that the above description of the present invention is susceptible to various modifications, changes and adaptations. The laser used in the switching arrangement as described above and claimed in the claims is a semiconductor laser, e.g. a laser diode.

What is claimed is:

1. An optical switching arrangement comprising as a light source a laser with current supply means, an electrooptical modulator formed as a first two-arm interferometer with control electrodes, and connected after the modulator a second two-arm interferometer as a bistable element, said modulator passing light to said second two arm interferometer, and said second interferometer having a first output for a part of the light, a photodiode being connected to said first output, the output voltage of said photodiode being used as a control magnitude, wherein said second two-arm interferometer is formed with interferometer arms having optical path length differences between the two interferometer arms of the order of magnitude of $10^4$ of the wavelength of the light from said laser, wherein said second two-arm interferometer has at least one second output forming a respective at least one signal output, said signal output being arranged parallel to said first output; wherein the output voltage of said photodiode is used to control said current supply means of said laser; and wherein the wavelength of the light passed to said second two-arm interferometer is variable so that an output appears in bistable manner at one or other of said two output arms of said second interferometer according to said wavelength.

2. A switching arrangement according to claim 1, wherein said output voltage of said photodiode is amplified before being used to control said current supply of said laser.

3. A switching arrangement according to claim 1, wherein said modulator has a control voltage, and wherein said wavelength of the light is variable by changing said control voltage of the modulator.

4. A switching arrangement according to claim 1, wherein said current supply means of said laser has a bias voltage and wherein said wavelength of the light is variable by changing said bias voltage of said current supply means.

5. A switching arrangement according to claim 1, wherein said modulator is provided with first and second parallel outputs, said first output being connected to said second two-arm interferometer and a said second output being connected to a further photodiode, the output voltage of said photodiode being connected after amplification to said modulator as a control voltage for achieving a constant light intensity at said first output of said modulator; and wherein a variable bias voltage is provided for said current supply of said laser.

6. A switching arrangement according to claim 5, wherein said modulator comprises a Mach/Zehnder interferometer.

7. A switching arrangement according to claim 1, wherein said second two-arm interferometer comprises a Mach/Zehnder interferometer.

8. A switching arrangement according to claim 1, wherein said second two-arm interferometer comprises a Michelson interferometer.

* * * * *